United States Patent [19]

Mizuhara et al.

[11] 4,431,465

[45] Feb. 14, 1984

[54] BRAZING ALLOY PASTE

[75] Inventors: Howard Mizuhara, Hillsborough; Surya Pattanaik, San Jose, both of Calif.

[73] Assignee: GTE Products Corporation, Stamford, Conn.

[21] Appl. No.: 404,111

[22] Filed: Aug. 2, 1982

Related U.S. Application Data

[63] Continuation-in-part of Ser. No. 270,661, Jun. 4, 1981, abandoned.

[51] Int. Cl.[3] .............................................. B23K 35/34

[52] U.S. Cl. ........................................ 148/24; 148/25; 228/122

[58] Field of Search ..................... 148/24, 25; 228/122

[56] References Cited

U.S. PATENT DOCUMENTS 3,444,613 5/1969 Foerster ............................. 228/122

3,589,952 6/1971 Burne ................................... 148/24

4,273,593 6/1981 Mastrangelo ......................... 148/25

*Primary Examiner*—Veronica O'Keefe

*Attorney, Agent, or Firm*—Donald R. Castle; John F. Lawler

[57] ABSTRACT

An improved brazing alloy paste comprises a brazing alloy powder mixed with a ductile metal spacer powder comprised of spherical particles with a predetermined diameter limit and having a higher melting temperature than that of the alloy, both powders being suspended in a gel-like substance. This composite paste produces a brazed joint having a gap with a controlled width and the ductile metal absorbs stresses developed between dissimilar brazed parts as when a tungsten carbide tool bit and the supporting steel shank cool after they are brazed together. The quantity of spherical spacer powder in the mixture is limited to 1-8% by weight of the mixture, preferably 5%, in order to prevent stacking of the spheres and to insure a gap spacing determined by the diameter of the spheres.

5 Claims, No Drawings

BRAZING ALLOY PASTE

This is a continuation-in-part of application Ser. No. 270,661 filed June 4, 1981, now abandoned.

BACKGROUND OF THE INVENTION

This invention relates to brazing alloys and more particularly to an improved alloy paste for brazing together parts such as tungsten carbide tool bits and a supporting steel body or shank.

The brazing together of two dissimilar metals such as tungsten carbide and steel raises the problem of stress being developed in the brazed joint on cooling because of the different coefficients of expansion of the brazed parts. This stress can result in cracks in the joint leading to its ultimate failure. One technique which has been used to alleviate such stress is a three layer solid brazing alloy having a ductile center layer sandwiched between two brazing layers, the center layer having a melting temperature higher than that of the outer layers. On cooling, the ductile center layer absorbs the stress developed by the different contraction rates of the joined members. A multi-layer brazing alloy of this type is described in U.S. Pat. No. 4,340,650.

One of the drawbacks of solid multi-layer preforms of this type is that they must be stamped, cut, blanked or otherwise formed to the many different shapes and sizes of the members being joined, involving many production steps and resulting in a large inventory of preforms. In addition, preforms generally are preplaced between the members manually or by related techniques which are not well suited for automated high-volume production methods. On the other hand, brazing alloy paste is simple to prepare, eliminates inventory problems, and is ideally suited for placement on joints to be brazed through use of automated paste metering equipment. It is highly desirable, therefore, that these advantages of brazing alloy paste be utilized in joining dissimilar metals such as mine tool bits to steel shanks. However, such pastes of the prior art do not have any provision for relieving stress between the dissimilar members upon cooling and therefore are not a satisfactory substitute for the solid multi-layer prefroms for such applications.

Another technique that has been proposed is described in Pat. No. 2,606,362 to Martin, et al. This patent teaches brazing joint thickness control by the addition of 30–35% by volume of inert (tungsten) particles to the joint during the brazing operation and the use of brazing alloy preforms in making the joint. The disadvantages of this technique are the substantial reduction in the quantity of filler alloy available for the joint, the necessity of maintaining an inventory of preforms of different sizes, and the difficulty of handling and placement of the preforms during the brazing operation.

U.S. Pat. No. 2,451,099 of La Motte describes a method of bonding ferrous metal propeller blade parts with foil or powdered filler metal together with steel or nickel spacing balls. The disadvantages of this method are the necessity of maintaining separate inventories of preforms or powder and balls and the difficulty of placement of these parts during brazing of complex shapes.

This invention is directed to a brazing alloy paste which overcomes these problems.

A general object of this invention is the provision of a brazing alloy paste for joining members having different thermal coefficients of expansion.

A further object is the provision of a brazing alloy paste capable of maintaining a predetermined gap thickness between parts being joined.

A more specific object is the provision of a brazing alloy paste useful for high-volume brazing of joints between similar and dissimilar metals.

These and other objects of the invention are achieved with a brazing alloy paste containing a ductile spacer metal comprising spherically shaped particles of predetermined diameter and having a melting temperature greater than that of the brazing alloy. The metal spheres are mixed in the paste at a relatively low concentration to avoid stacking and thereby control the thickness of the joint to approximately the diameter of the spheres while providing a stress-relieving interface, if desired, between the parts being joined.

In preparing a paste in accordance with the principles of this invention, the spacer metal is atomized to produce spherically shaped powder and has a melting temperature sufficiently greater than that of the brazing alloy powder with shich it is mixed that the former does not melt when the alloy melts and flows. In addition, the metals or alloys comprising the brazing alloy and the spacer metal are selected to minimize the alloying of these two components while providing that the spherical particles are wetted by the alloy. Examples of components which meet these conditions are a brazing alloy consisting of Nicuman 37 manufactured by GTE Products Corporation, WESGO Division (nominal composition by weight 9.5% Ni-52.5% Cu-38.0% Mn) or Nicuman 23 (nominal composition by weight 9.0% Ni-67.5% Cu-23.5% Mn) and a spacer metal useful with these alloys selected from a group consisting of copper, and either iron or 1010 steel. Other compositions are a brazing alloy of copper or silver-copper eutectic and a spacer metal of nickel, iron or 1010 steel.

The spherically shaped spacer metal powder is obtained by atomizing. This powder is then passed through the fine screen with a sieve grading selected to pass particles having a predetermined diameter for example 10 mils. The screened powder is then mixed with the brazing alloy powder and a water soluble resin or a hydroxypropyl cellulose in sufficient proportions to provide a paste of desired consistency.

As noted above the ratio of the spherically shaped spacer metal powder to the brazing alloy powder in the mixture is limited in order to insure that the spheres will not stack on top of each other in the braze joint. For this reason the spherical powder content is maintained in the range of 1–8% by weight of the metal components of the paste, a preferred composition being about 5% by weight.

EXAMPLE I

Two coupons of 1010 steel measuring 1"×0.5"×0.0625" thick were stacked together after a dab of brazing alloy paste was placed between the coupons. The paste comprised Nicuman 37 together with spacer metal iron in one sample and nickel in another, both being mixed with a water soluble resin such as FC-6 gel manufactured by WESGO Division of GTE Products Corporation to a thick consistency. The diameter of the spheres comprising the iron and nickel spacer metals was in the range of 7 to 20 mils (177–500 μm) and pastes were made with 0, 5, 10 and 20% by weight of spacer metal to total brazing alloy mixture. A 200 gram weight was placed on each test speciman which was brazed in vacuum ($1\times10^{-5}$ Torr) at temperatures between 975° C. and 1014° C. for 15 minutes. The resulting samples were sectioned, metallographically prepared and examined under the microscope. Observation indicated that Nicuman 37 had partially dissolved most of the nickel spheres while the iron or 1010 steel spheres were not affected.

Knoop micro-hardness tests across the brazed joint showed no variation in hardness either in the base metal or in the brazing region. A typical hardness of 116 $Kg/mm^2$ was observed in the 1010 steel coupons and 187 $Kg/mm^2$ in the Nicuman 37 braze area with a 100 gram test load. The braze gap thickness in all examples were measured. The braze made with the Nicuman 37 paste without any metal powder addition had about a 2 mil gap. The braze made with paste having a 5% iron powder concentration resulted in a very good joint having approximately a 23 mil gap. Joints similarly produced with pastes having 10 and 20% iron sphere concentrations were shown to have numerous voids believed to be the result of stacking of the iron spheres on each other and thus preventing the coupons from optimally squeezing the melted brazing alloy.

EXAMPLE II

A second series of tests were carried out using pastes similar to those used in Example I, except that spherical iron powder particles having diameters in the range of 9.8 to 11.7 mils (250–297 μm) were used as the spacer metal. Pastes were made with 2.5, and 7% by weight of the spacer metal. In each case a dab of paste was placed between a cemented carbide chip measuring 0.38"×0.25×0.09"and 1010 and 4340 steel coupons of approximately 1"×0.5"×0.125" and brazed as described in Example I.

Metallographic examination of cross-sections of the joints showed excellent brazes in all cases. The braze gap thicknesses in all examples were measured and are given in Table I.

TABLE I

| Brazing Paste (% by weight) | Average Gap mil | Average Gap μm |
|---|---|---|
| 2.5 Fe spheres | 12.0 | 304.5 |
| 5 Fe spheres | 10.65 | 270.5 |
| 7 Fe spheres | 11.40 | 289.00 |

It will be noted that the measured gaps in the range of 10.7 to 12.0 mils, correspond closely to the spacer metal diameters of 9.8 to 11.7 mil.

EXAMPLE III

A paste, comprising of 95% Nicuman 37, and 5% spherical iron powder with diameters in the range of 9.8 to 11.7 mil (250–297 μm) was made by mixing with a gel. The gel was made from a hydroxypropyl methyl cellulose made and sold under the trademark METHOCEL J 40M by Dow Chemical Company.

A cemented carbide to 1010 steel braze was made with the above paste as described in Example II.

The metallographic examination showed that an excellent braze resulted. The braze gap was 12.40 mils (315 μm) and corresponded closely to the diameter of the spacer metal use.

EXAMPLE IV

A copper based brazing paste was used to braze together two coupons of 1010 steel. The paste consisted of a mixture of 97% by weight of copper powder (−140M) and 3% by weight of 1010 steel powder (−50M+60M) together with 3.5% by weight of Methocel J 75M gel and 96.5% by weight water, the powder mixture and the gel being proportioned in a ratio of 85% and 15%, respectively. The designation "M" is for mesh size under the U.S. Standard Sieve system; the minus sign before the mesh size means the powder passes through the mesh while it does not pass through the mesh size preceded by plus sign. For reference purposes, 140M=0.0041", 80M=0.0070" (177 microns), 60M=0.0098" (250 microns), and 50M=0.0117" (297 microns). The brazing operation was conducted as described in Example I in a hydrogen atmosphere furnace at a temperature of 1125° C. for five minutes. The resulting sample was sectioned, metallographically prepared and examined under a microscope, indicating that an excellent braze had been made. The gap measured 12.5 mils (310μ) uniformly across the joint.

EXAMPLE V

Cemented tungsten carbide was brazed as described in Example I to 410 stainless steel using the following copper-based brazing paste with 12 mil diameter iron spacer spheres:

Powder (% by weight)
- 97 copper (−140M)
- 3 iron (−50M+60M)

Gel
- 3.5 Methocel 75M
- 96.5 Water

The paste, consisting of a mixture of 85% powder and 15% gel, was applied to the tungsten carbide and steel pieces and heated for five minutes at 1120° C. in vacuum furnace ($10^{-5}$mm Hg). The resulting brazed joint was excellent and had a controlled gap of 12.5 mils ( 310μ).

EXAMPLE VI

A 1010 steel coupon was brazed as in Example I to a metallized (molybdenum-manganese system) ceramic body of 97.6% alumina, sold by Wesgo Division of GTE Products Corporation as AL-300, using the following paste made of a silver-copper eutectic alloy of 72% Ag-28% Cu with 10 mil nickel spherical powder (in percent by weight):

Powder
- 97 silver-copper eutectic−140M
- 3 nickel powder−60M+80M

Gel
- 3.5 Methocel J 75M
- 96.6 Water

The powder and gel were mixed in a ratio of 85% and 15%, respectively, to form the paste which was applied between the steel and metallized ceramic body and heated in a hydrogen atmosphere at 825° C. for five minutes. The resulting brazed joint was excellent and had a uniform gap of 11 mils.

What is claimed is:

1. A brazing alloy paste for joining cemented carbide and steel objects comprising a mixture of a brazing alloy powder having a nickel-copper-manganese composition and a gel consisting of a water soluble resin and a plurality of iron spheres consisting essentially of 1–8% by weight of the metal components of the paste, said spheres having a diameter in the range of 177–500 microns.

2. The paste according to claim 1 in which said spheres consist essentially of 5% by weight of the metal components of the paste and have a diameter in the range of 250–296 microns.

3. A brazing alloy paste for joining metal objects comprising a mixture of a brazing alloy powder having a copper composition and a gel consisting of a water soluble resin and a plurality of iron spheres consisting essentially of 1–8% by weight of the metal components of the paste, said spheres having a diameter in the range of 177–500 microns.

4. The paste according to claim 3 in which said spheres consist essentially of 3% by weight of the metal components of the paste and have a diameter in the range of 250–297 microns.

5. A brazing alloy paste for joining a metal object to metallized alumina comprising a mixture of a silver-copper eutectic alloy powder and a gel consisting of a water soluble resin and a plurality of nickel spheres consisting of 1–8% by weight of the metal components of the paste, said spheres having a diameter in the range of 250–297 microns.

* * * * *